United States Patent [19]

Howenstine et al.

[11] Patent Number: 5,797,276
[45] Date of Patent: Aug. 25, 1998

[54] METHODS AND DEVICES FOR ENERGY CONSERVATION IN REFRIGERATED CHAMBERS

[76] Inventors: Mervin W. Howenstine, 7817 Smolley Way, Citrus Park, Calif. 95610; Allan E. Schrum, 3197 Boeing Rd., Cameron Park, Calif. 95682

[21] Appl. No.: 905,259

[22] Filed: Aug. 1, 1997

Related U.S. Application Data

[63] Continuation of Ser. No. 597,023, Feb. 5, 1996, abandoned, which is a continuation of Ser. No. 99,823, Jul. 28, 1993, Pat. No. 5,488,835.

[51] Int. Cl.[6] ............................................. F25D 17/06
[52] U.S. Cl. ................................. 62/186; 63/216
[58] Field of Search .......................... 62/186, 180, 229, 62/182, 216, 222; 236/51

[56] References Cited

U.S. PATENT DOCUMENTS

| | | | |
|---|---|---|---|
| 2,959,929 | 11/1960 | McGrath | 62/186 X |
| 3,070,972 | 1/1963 | Atchison | 62/180 |
| 3,464,225 | 9/1969 | Watrous et al. | 62/180 X |
| 3,545,219 | 12/1970 | Falk | 62/180 X |
| 3,739,596 | 6/1973 | Ballard | 62/182 X |
| 3,877,243 | 4/1975 | Kramer | 62/180 |
| 3,959,979 | 6/1976 | Kramer | 62/180 X |
| 4,167,966 | 9/1979 | Freeman | 62/180 X |
| 4,362,270 | 12/1982 | Cleary et al. | 236/51 X |
| 4,682,648 | 7/1987 | Fried | 236/51 X |
| 5,488,835 | 2/1996 | Howenstine et al. | 62/186 |

FOREIGN PATENT DOCUMENTS 57-21739  2/1982  Japan.

*Primary Examiner*—Harry B. Tanner
*Attorney, Agent, or Firm*—Bielen, Peterson & Lampe

[57] ABSTRACT

Methods and devices for energy conservation to be retrofitted to refrigerated chambers or boxes of the type comprising an insulated chamber and an associated compression-type refrigeration system. The energy conservation devices disclosed are adapted to be mounted within the refrigerated chamber, on or within the evaporator, and connected to the thermostatic switch and the evaporator fans located within the refrigerated chamber.

2 Claims, 10 Drawing Sheets

METHODS AND DEVICES FOR ENERGY CONSERVATION IN REFRIGERATED CHAMBERS

This is a continuation of application Ser. No. 08/099,823 filed on Jul. 28, 1993, U.S. Pat. No. 5,488,835 which is a continuation of application Ser. No. 08/597023, filed 5 Feb. 1996, abandoned.

BACKGROUND OF THE INVENTION

1. Field of the Invention

The present invention relates to refrigerated chambers or boxes of the type comprising an insulated chamber and an associated compression-type refrigeration system including an electrically-driven compressor, refrigerant conduit means, evaporator means contained within said chamber, one or more evaporator fans contained within said chamber, and thermostatic switch means contained within said chamber for controlling the operation of said compressor or the recirculation of said refrigerant, and more particularly to energy conservation methods and devices for operating said evaporator fan or fans at a high speed when said thermostatic switch means is in a first state and for operating said evaporator fan or fans at a low speed when said thermostatic switch means is in a second state.

2. Description of the Prior Art

It is known in the prior art to provide compression refrigeration systems for refrigerated chambers with control means for controlling the speed of the evaporator fan or fans thereof in accordance with some sub-system condition, such as the operating state of the compressor motor.

For example, U.S. Pat. No. 3,877,243, issued to Daniel E. Kramer on Apr. 15, 1975, discloses a refrigeration system having a compressor driven by a motor having a control for turning it on and off, and an evaporator which includes a motor-driven fan where the fan motor can operate at high speed or at low speed, and where the fan motor is connected to operate at high speed when the compressor motor is on and to operate at low speed when the compressor motor is off.

The low speed fan energizing voltage for single speed evaporator fan motors in Kramer is obtained by either (a) connecting the fan motor or fan motors between the neutral connection and one leg of a three-phase power source, or (b) connecting a reactor or choke in parallel connection with a relay in series with each evaporator fan motor.

The three-phase embodiment (a) of Kramer suffers from the disadvantage that in many existing installations the compressor is remote from the insulated chamber and thus the retrofitting of an evaporator fan motor controller of the type used in Kramer would, in many cases, require the provision of a substantial amount of new wiring.

Further, as is well known to those having ordinary skill in the art, very few compression-type refrigeration systems used in connection with refrigerated chambers energize the evaporator fan motor or motors with three-phase power, and thus the three-phase embodiment of Kramer is applicable to only a few compression-type refrigeration systems used in connection with refrigerated chambers.

Yet further, since a vast majority of such refrigeration systems comprise 120-volt evaporator fan motors, the three-phase embodiment of Kramer is applicable to only a small minority of refrigerated chambers.

The reactor embodiment (b) of Kramer suffers from the disadvantage that the reactor or choke connected in series with each evaporator fan motor in a particular system must be selected in accordance with the characteristics of that fan motor, thereby requiring the installer to have knowledge of Ohm's Law for alternating current circuits, which knowledge many installers lack, and, in the event that reactors of suitable inductance are not available, necessitating the winding of special reactors.

Further, the evaporator fan motor control system of Kramer suffers from the disadvantage that its operation is not failsafe when the coil of the relay connected across the compressor motor control relay coil fails. More particularly, when in the system of Kramer the relay coil 88 fails to function, i.e., to draw armature 84 against the urging of spring 86, the evaporator fans operate continuously at low speed, causing the evaporator to freeze up. Since, in this condition, no heat is exchanged, the refrigerant remains in a liquid state and is returned in a liquid state to the compressor via the suction line. The liquid refrigerant, upon reaching the compressor, is very likely to destroy the compressor due to the incompressibility thereof.

U.S. Pat. No. 4,485,633, issued to Eddie W. King and Robert D. Hughes on Dec. 4, 1984, (hereinafter "King") discloses a compression-type refrigeration system for chilled-product vending machines.

The system of King includes a temperature-based responsive control circuit including a product sensor for detecting the temperature of the chilled products and cycling the evaporator fan on in response to detected product temperatures above a predetermined limit, the predetermined limit being less than the temperature required to turn the compressor on, and a coil sensor for detecting the temperature below a predetermined limit, maintaining said evaporator fan on during and beyond the end of the compressor cycle, and cycling the evaporator fan off when the temperature of the coil stabilizes above the freezing point of water.

The King system suffers from the disadvantage that it requires the addition of two temperature sensors in the evaporator fan motor circuit, such as are not normally found in compression-type refrigeration systems for refrigerated chambers, thus increasing the cost and complexity of the control system of King.

Further, the evaporator fan motors are completely turned off during certain phases of the operating cycle of the system of King, thus raising the possibility that the air in the refrigerated space of the device of King may become stratified, and also raising the possibility that, in the absence of the heat provided by running fan motors, the temperature within the chamber may drop below the thermostatically set temperature when the temperature outside the insulated chamber is colder than the thermostatically set temperature. In this condition the grease in the evaporator fan motor bearings may stiffen to such an extent that the fan motors may not restart, resulting in fan motor winding burnout due to lack of counter electromotive force.

U.S. Pat. No. 4,467,617, issued to Annis R. Morgan, Jr., and Eddie W. King on Aug. 28, 1984, discloses a compression-type refrigeration system for chilled-product vending machines which is similar in many ways to the system of the above-discussed King patent, except that the on and off cycling of the evaporator fan motors is accomplished by timing devices, rather than by temperature sensitive devices.

In general, then, the disadvantages of the King device, as discussed hereinabove, are also characteristic of the device of the Morgan and King patent.

It is believed that the documents listed immediately below contain information which might be considered to be material to the examination hereof.

U.S. Pat. No. 3,070,972
U.S. Pat. No. 3,398,889
U.S. Pat. No. 3,505,828
U.S. Pat. No. 3,514,967
U.S. Pat. No. 3,517,523
U.S. Pat. No. 4,109,482
U.S. Pat. No. 4,167,966
U.S. Pat. No. 4,673,850
Japanese Patent No. 57-21739
Japanese Patent No. 56-151826

It is to be understood that the term "prior art" as used herein or in any statement made by or on behalf of applicants means only that any document or thing referred to as prior art bears, directly or inferentially, a date which is earlier than the effective filing date hereof.

No representation or admission is made that any of the above-listed documents is part of the prior art, or that an exhaustive search has been made, or that no more pertinent information exists.

A copy of each of the above-listed documents is supplied to the United States Patent and Trademark Office herewith.

SUMMARY OF THE INVENTION

Accordingly, it is an object of the present invention to provide energy conservation devices for insulated chambers refrigerated by compression-type refrigeration systems, which energy conservation devices can be quickly and easily retrofitted to such refrigeration systems.

Another object of the present invention is to provide energy conservation devices which achieve the above object and can be retrofitted to existing refrigerated chambers by minimum length additional wiring.

Yet another object of the present invention is to provide energy conservation devices which achieve one or more of the above objects and which can be retrofitted to existing refrigerated chambers without malting electrical calculations or taking electrical measurements.

A further object of the present invention is to provide energy conservation devices which achieve one or more of the above objects and which can be retrofitted to existing refrigerated chambers without providing electrical components especially selected or fabricated to meet the requirements of particular installations.

Yet another object of the present invention is to provide energy conservation devices which achieve one or more of the above objects and which are universal in application, in that virtually any medium-size, built-up, reach-in or walk-in refrigerated chamber can be retrofitted with one of a selection of not more than four embodiments of the invention without custom fitting or modification to meet the requirements of a particular refrigerated chamber.

A further object of the present invention is to provide energy conservation devices which achieve one or more of the above objects and which further include carrier current signal links which obviate the provision of greatly elongated wire connections when the thermostatic switches of such refrigerated chambers are located at considerable distance from the evaporator fans thereof, or when the running of thermostat leads is otherwise rendered difficult by the circumstances of the installation.

Another object of the present invention is to provide energy conservation devices which achieve one or more of the above objects and at the same time are independent of the input impedance of the existing compressor motor controller or solenoid valve connected across the terminals of the existing thermostatic switch, so that the retrofitting of an energy conservation device of the invention to an existing refrigeration system for a refrigerated chamber does not impair the operation of the existing refrigeration system.

A still further object of the present invention is to provide energy conservation devices which achieve one or more of the above objects and at the same time are not connected across the terminals of an existing thermostatic switch or across the coil of a solenoid valve in a refrigerant line, and thus do not affect the operation of an existing compressor motor control or solenoid valve in a refrigerant line.

Another object of the present invention is to provide energy conservation devices which achieve one or more of the above objects and which include refrigeration system operating condition detectors which are adapted to be installed in the evaporator of an associated refrigeration system by means of simple mechanical clamps without modifying the refrigeration system.

Yet another object of the present invention is to provide energy conservation devices which achieve one or more of the above objects and which can be mounted on the evaporators of associated compression-type refrigeration systems and also connected to associated refrigeration system operating condition detectors located within such evaporators by means of minimum length, low voltage wiring, and also can be connected between the fan motors of said evaporators and the associated fan motor voltage sources with little change in the existing fan-motor-to-fan-motor-voltage-source wiring.

Yet another object of the present invention is to provide energy conservation devices which achieve one or more of the above objects without intermittently turning off the evaporator fan or fans, thereby avoiding stratification of the air in the refrigerated chamber and also avoiding the dropping of the temperature of the air within the refrigerated chamber below the temperature set by the operation of the thermostatic switch when the temperature of the ambient air surrounding the refrigerated chamber falls considerably below the set temperature.

Another object of the present invention is to provide energy conservation devices which achieve one or more of the above objects and which at the same time are devoid of additional thermostatic switches or mechanical timers, whereby the cost of each such device is reduced to a practical minimum.

Another object of the present invention is to provide energy conservation devices which achieve one or more of the above objects and which at the same time are failsafe, in that malfunction of the mechanical or electrical relay portion of the device results in continuous high-speed operation of the evaporator fans thereby avoiding the possible destruction of the refrigeration system compressor which occurs in prior art devices in which malfunction of the relay results in continuous low-speed operation of the evaporator fans, and the consequent imission of liquid refrigerant to the compressor.

Yet another object of the present invention is to provide energy conservation devices which achieve one or more of the above objects and which do not require the provision of special reactors or chokes to accommodate particular evaporator fan motor parameters or changing degrees of evaporator fan motor bearing drag.

A further object of the present invention is to provide energy conservation devices which achieve one or more of the above objects and at the same time conserve energy by reducing the power supplied to the evaporator fan motors by up to 85% when the compressor is not in operation.

Yet another object of the present invention is to provide energy conservation devices which achieve one or more of the above objects and at the same time conserve energy by reducing the heat produced within the insulated chamber by the evaporator fan motors when the associated compressor is not in operation.

Another object of the present invention is to provide energy conservation devices which achieve one or more of the above objects and at the same time reduce dehydration of certain types of unsealed stored goods, such as meats, produce, flowers, and plants, and thus greatly extend the refrigerated storage life of such goods.

Yet another object of the present invention is to provide energy conservation devices which achieve one or more of the above objects and can be retrofitted to refrigerated chambers supplied by 120 volt or 208 volt electrical systems, single-phase or multi-phase, without providing particular embodiments of the device of the invention adapted to particular voltages or system phase arrangements, and without providing additional electrical components for adapting the device of the invention to particular voltages or particular system phase arrangements.

A further object of the present invention is to provide energy conservation devices which achieve one or more of the above objects and which do not require the redesign or modification of any insulated chamber or its associated refrigeration system to which an energy conservation device of the present invention is retrofitted.

Another object of the present invention is to provide energy conservation devices which achieve one or more of the above objects and which are adapted for immediate retrofitting, without modification, to the refrigerated systems of the refrigerated chambers found in restaurants, markets, liquor stores, schools, hospitals, and other establishments.

A yet further object of the present invention is to provide energy conservation devices which achieve one or more of the above objects and which provide the necessary moisture-resistance and physical integrity to withstand the extreme environments of refrigerated chambers.

Another object of the present invention is to provide energy conservation devices which achieve one or more of the above objects and produce overall energy savings in excess of 25%.

Yet another object of the present invention is to provide energy conservation devices which achieve one or more of the above objects and can be successfully retrofitted to existing refrigerated chambers having evaporator fan motors of different types, e.g., different power requirements or different horsepower ratings.

Another object of the present invention is to provide energy conservation devices which achieve one or more of the above objects and which operate independently of the operation of the compressor motor.

Another object of the present invention is to provide energy conservation devices which achieve one or more of the above objects and are not limited in applicability to refrigerated chambers the refrigeration systems of which comprise evaporator fan motors of a particular type, such as series wound motors.

A yet further object of the present invention is to provide energy conservation devices which achieve one or more of the above objects and are not limited in application to refrigerated chambers the refrigeration systems of which employ two-speed motors as evaporator fan motors.

Another object of the present invention is to provide methods of conserving electrical energy in the operation of compression-type refrigeration systems which refrigerate the interiors of insulated chambers.

Yet another object of the present invention is to provide methods for rapidly, cheaply and efficiently installing energy conservation devices in insulated chambers for controlling the evaporator fan motors of the compression-type refrigeration systems whereby the interiors of those insulated chambers are refrigerated.

Other objects of the present invention will in part be obvious and will in part appear thereinafter.

The present invention, accordingly, comprises the several steps and the relation of one or more such steps with respect to each of the others, and the apparatus embodying features of construction, combinations of elements, and arrangements of parts, all as exemplified in the following disclosure, and the scope of the present invention will be indicated in the claims appended hereto.

In accordance with a principal feature of the present invention, an energy conservation device adapted for retrofitting to the refrigeration system of a refrigerated chamber is comprised of (a) condition sensing means for sensing the state or operating condition of the thermostatic switch of the refrigeration system, (b) evaporator fan energizing voltage source means capable of providing a plurality of different evaporator fan energizing voltages, and (c) switching means responsive to said condition sensing means for applying a higher one of said evaporator fan energizing voltages to the evaporator fan of fans of said refrigeration system when said thermostatic switch is in a first state or condition and for applying a lower one of said evaporator fan energizing voltages to the evaporator fan or fans of said refrigeration system when said thermostatic switch is in a second state or condition.

In accordance with another principal feature of the present invention, in a first embodiment thereof, said condition sensing means is the coil of a relay, said switching means is the contact means of the same relay, and said evaporator fan energizing voltage source means is an autotransformer.

In accordance with yet another principal feature of the present invention, in a second preferred embodiment thereof, said condition sensing means is a sensitive relay, said switching means is a power relay the operation of which is controlled by said sensitive relay, and said evaporator fan energizing voltage source means is an autotransformer.

In accordance with a further principal feature of the present invention, in a third preferred embodiment thereof, said condition sensing means is a first solid state electronic relay circuit, said switching means is a second solid state electronic relay circuit, and said evaporator fan energizing voltage source means is an autotransformer.

In accordance with yet another principal feature of the present invention, said first and second solid state electronic relay circuits of said third preferred embodiment are comprised of integrated circuit devices of the kind known as "triac drivers" and integrated circuits of the kind known as "triacs".

In accordance with a further principal feature of the present invention, in a fourth preferred embodiment thereof, said condition sensing means is comprised of an electromagnetic relay or a solid state electronic relay and a carrier current signal transmitter and said switching means is comprised of an electromagnetic relay or a solid state electronic relay circuit and a carrier current signal receiver.

In accordance with another principal feature of the present invention, the condition sensing means, the switching means, and the evaporator fan energizing voltage source means of particular energy conservation devices of the present invention are encapsulated or potted as a single unit, thereby rendering said particular energy conservation devices highly resistant to the conditions of temperature, humidity, etc., existing within a refrigerated chamber.

In accordance with yet another principal feature of the present invention, the method of installing an energy conservation device of the present invention, which method is itself a part of the present invention, comprises the step of mounting or otherwise locating that energy conservation device within the refrigerated chamber to the refrigeration system of which it is to be retrofitted.

In accordance with another principal feature of the present invention, said method of installing an energy conservation device of the present invention further comprises the step of interconnecting the terminals of that energy conservation device with the terminals of the thermostatic switch of the refrigeration system to which it is retrofitted by means of short, insulated electrical wires, all of which short, insulated electrical wires are contained within the refrigerated chamber in which that energy conservation device is located.

For a fuller understanding of the nature and objects of the present invention, reference should be had to the following detailed description, taken in connection with the accompanying drawings.

DESCRIPTION OF THE PREFERRED EMBODIMENTS

Figure 1:
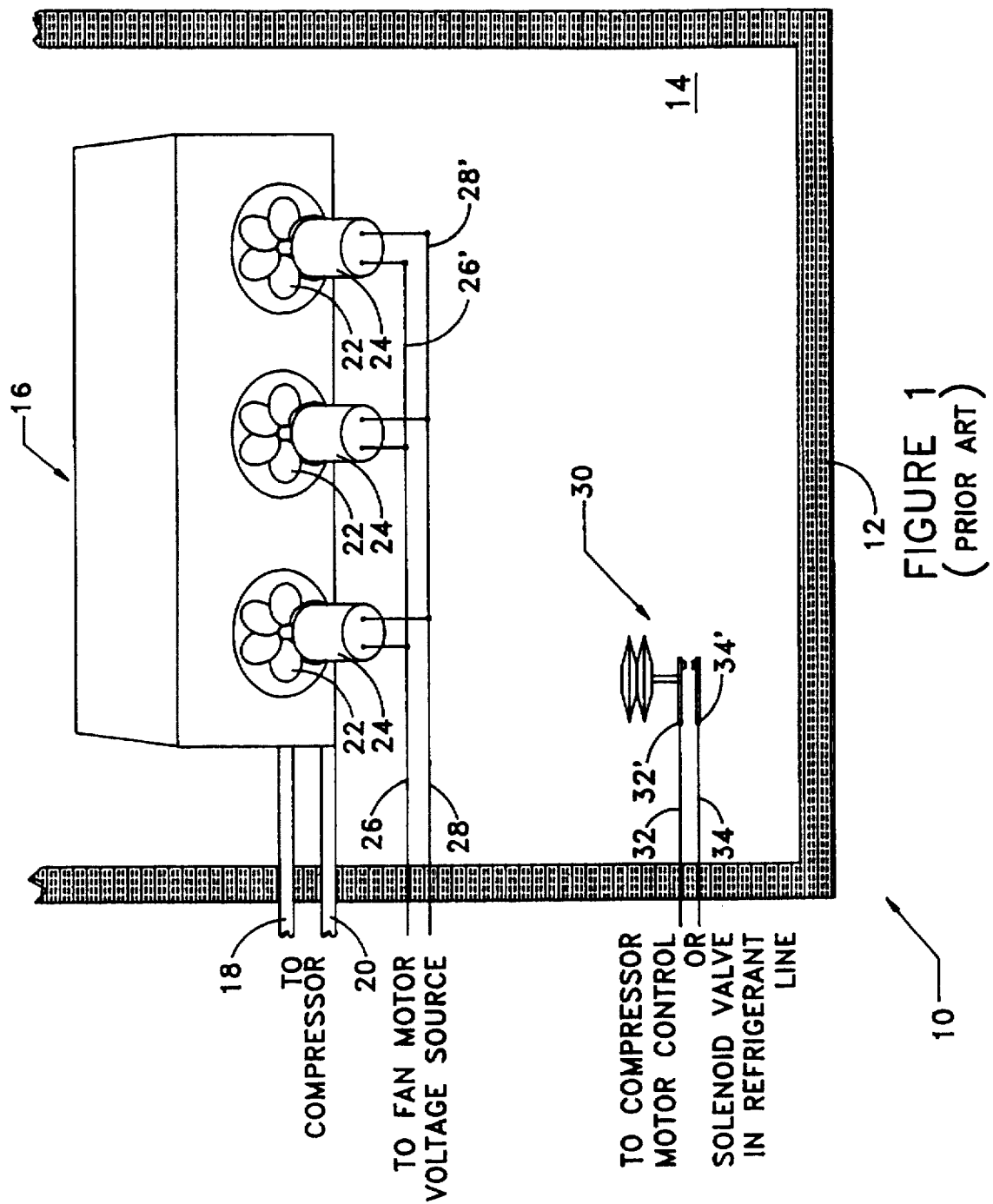
FIG. 1 is a schematic representation of a refrigerated chamber of the prior art.

Referring now to FIG. 1, there is schematically represented a refrigerated chamber 10 of the prior art and certain parts of its associated refrigeration system.

As seen in FIG. 1, refrigerated chamber 10 is comprised of an enclosure or housing 12 which defines an insulated chamber 14.

In the well known manner, the walls of refrigerated chamber 10 are generally fabricated from material having thermal insulating properties and include one or more doors which are normally closed, and which doors may themselves have thermal insulating properties.

As further schematically represented in FIG. 1, typical prior art refrigerated chamber 10 further comprises an evaporator 16 of well known type which is located within insulated chamber 14.

Also in the well known manner, the heat transfer means of evaporator 16 is supplied with refrigerant under pressure by an associated compressor located externally of enclosure 12, via a supply conduit 18, which refrigerant, under lower pressure, is returned to said external compressor via a return conduit 20.

As further seen in FIG. 1, a plurality of evaporator fans 22 are suitably juxtaposed to evaporator 16 so as to pass an air stream over the heat transfer elements of evaporator 16, each fan 22 being driven by an associated electric motor 24.

Energizing voltage is supplied to evaporator fan motors 24 via common wires or busses 26, 28 from a source of fan motor energizing voltage located outside enclosure 12.

In prior art refrigerated chambers this fan motor energizing voltage is most commonly a continuous, unswitched source of 110-volt, 208 volt, or 220 volt AC voltage.

As further seen in FIG. 1, a thermostatic switch 30 is also contained within insulated chamber 14 and the terminals 32', 34' of thermostatic switch 30 are connected via insulated wires 32, 34 to the motor controller of the external compressor motor, or to a solenoid valve in refrigerant supply line 18.

Figure 2:
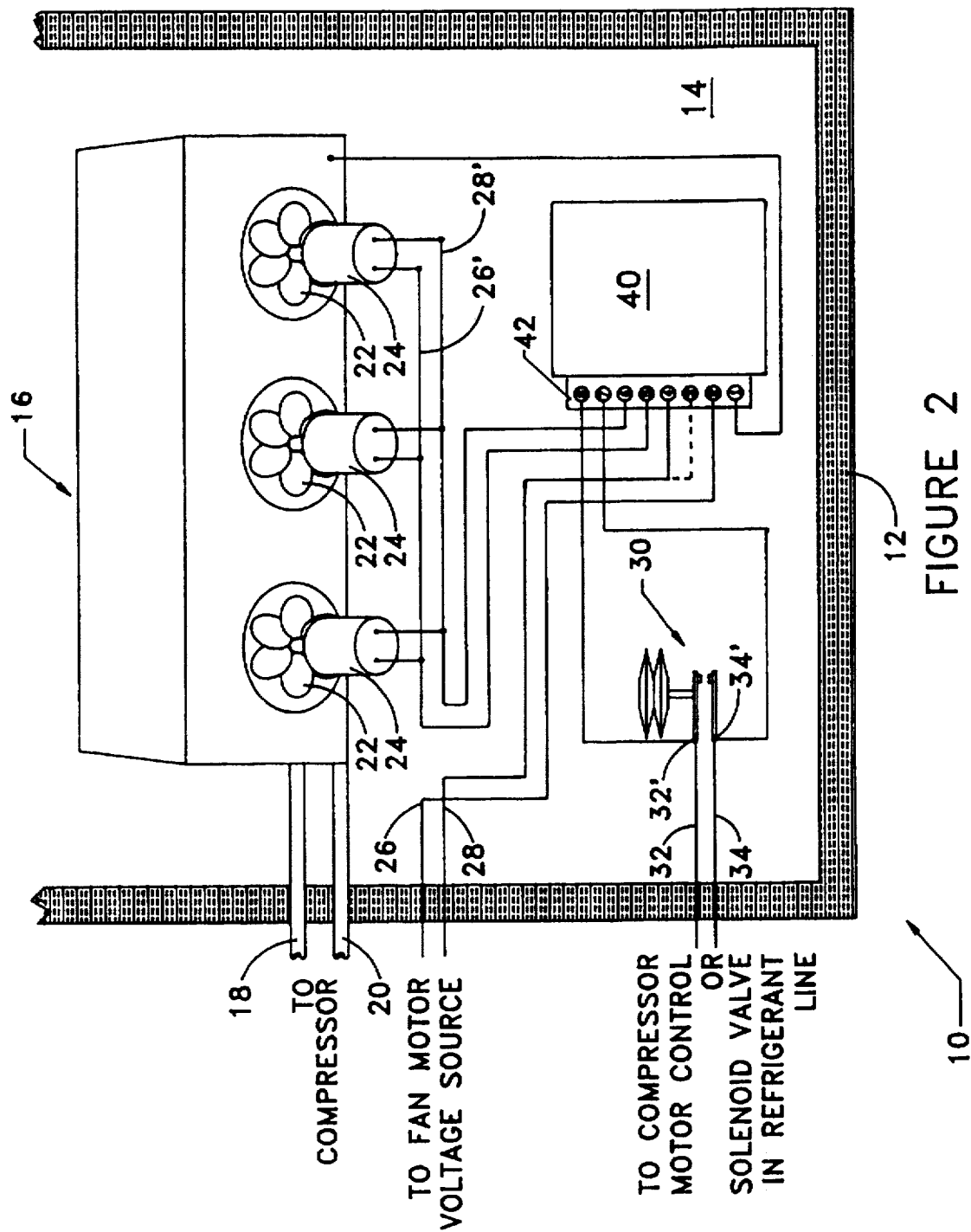
FIG. 2 is a schematic representation of a refrigerated chamber of the prior art equipped with an energy conservation device of the present invention.

Referring now to FIG. 2, it will be seen by those having ordinary skill in the art, informed by the present disclosure, that refrigerated chamber 10 and its parts 18 through 34 are the corresponding parts of the prior art device of FIG. 1, and that the only change made in the prior art device of FIG. 1 is the location of an energy conservation device 40 of the present invention within insulated chamber 14 and the interconnection of energy conservation device 40 with elements 26, 28, 32, and 34 of the refrigeration system of prior art refrigerated chamber 10, all by means of very short electrical leads contained completely within insulated chamber 14 in accordance with the energy conservation device installing method of the present invention.

It is to be particularly noted that the numerical designation of the terminals of terminal board 42 of energy conservation device 40 is maintained throughout the present drawings whenever applicable.

Figure 3:
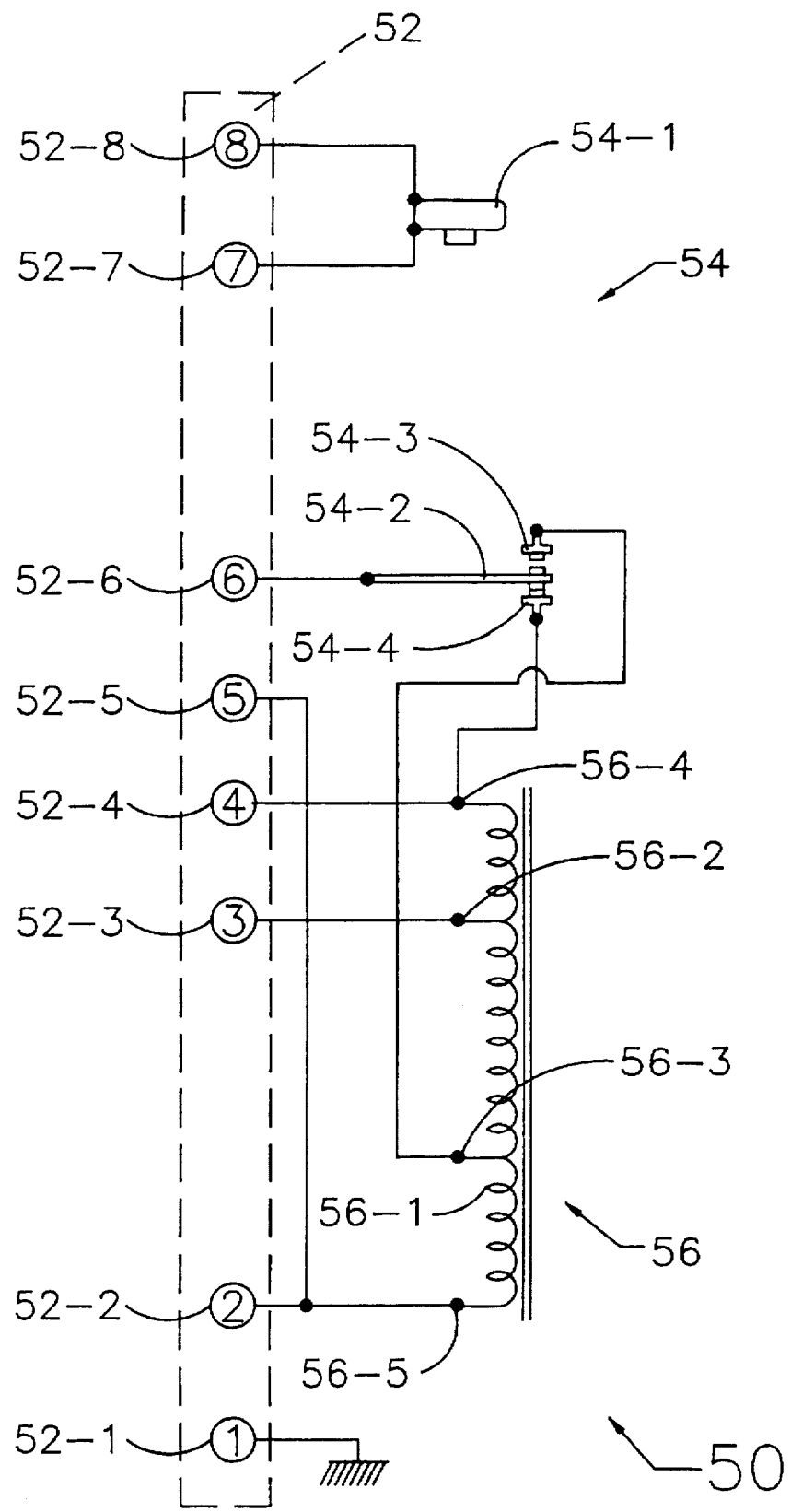
FIG. 3 is a schematic circuit diagram of an energy conservation device of the first preferred embodiment of the present invention.
Figure 3A:
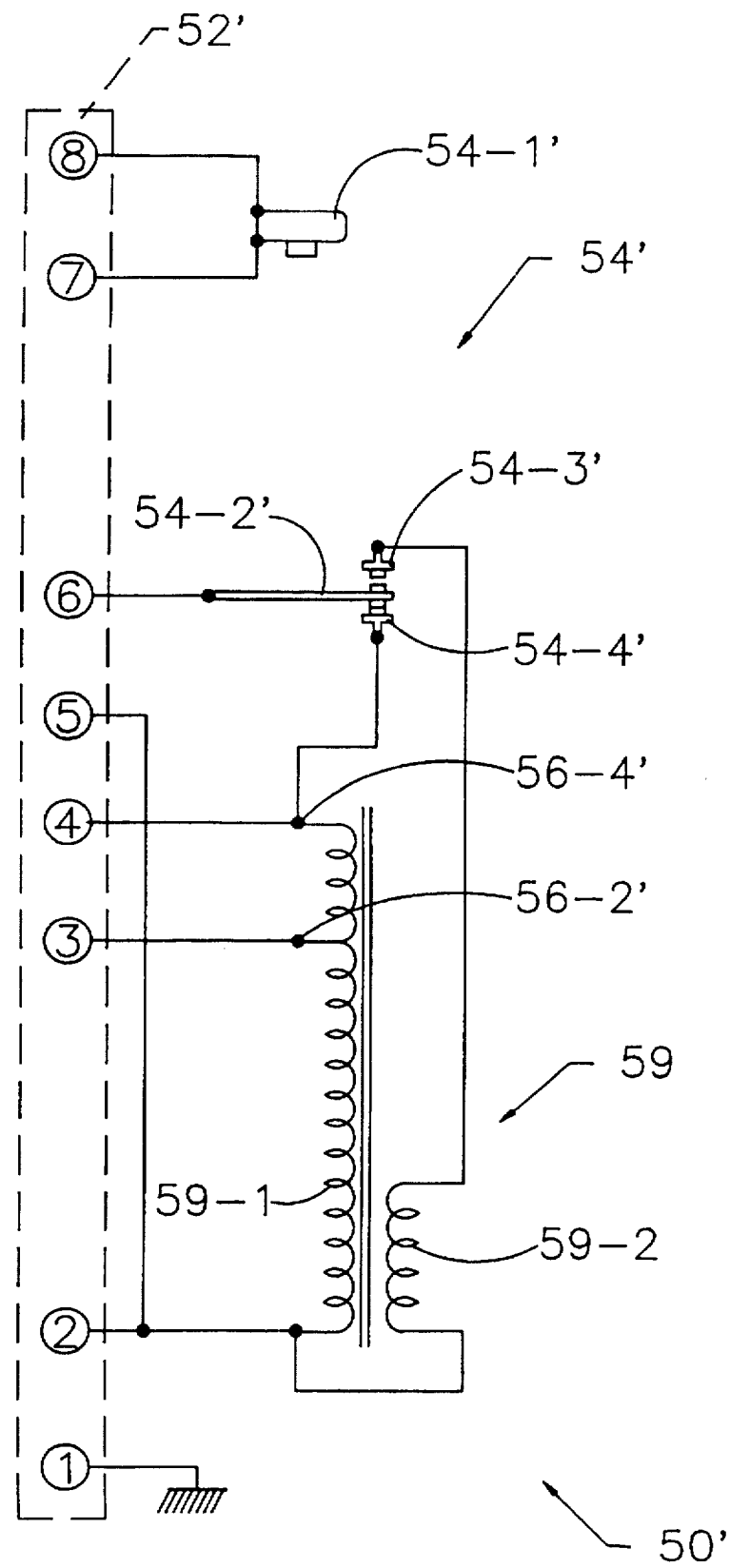
FIG. 3A is a schematic circuit diagram of an energy conservation device of an alternative version of said first preferred embodiment.
Figure 4:
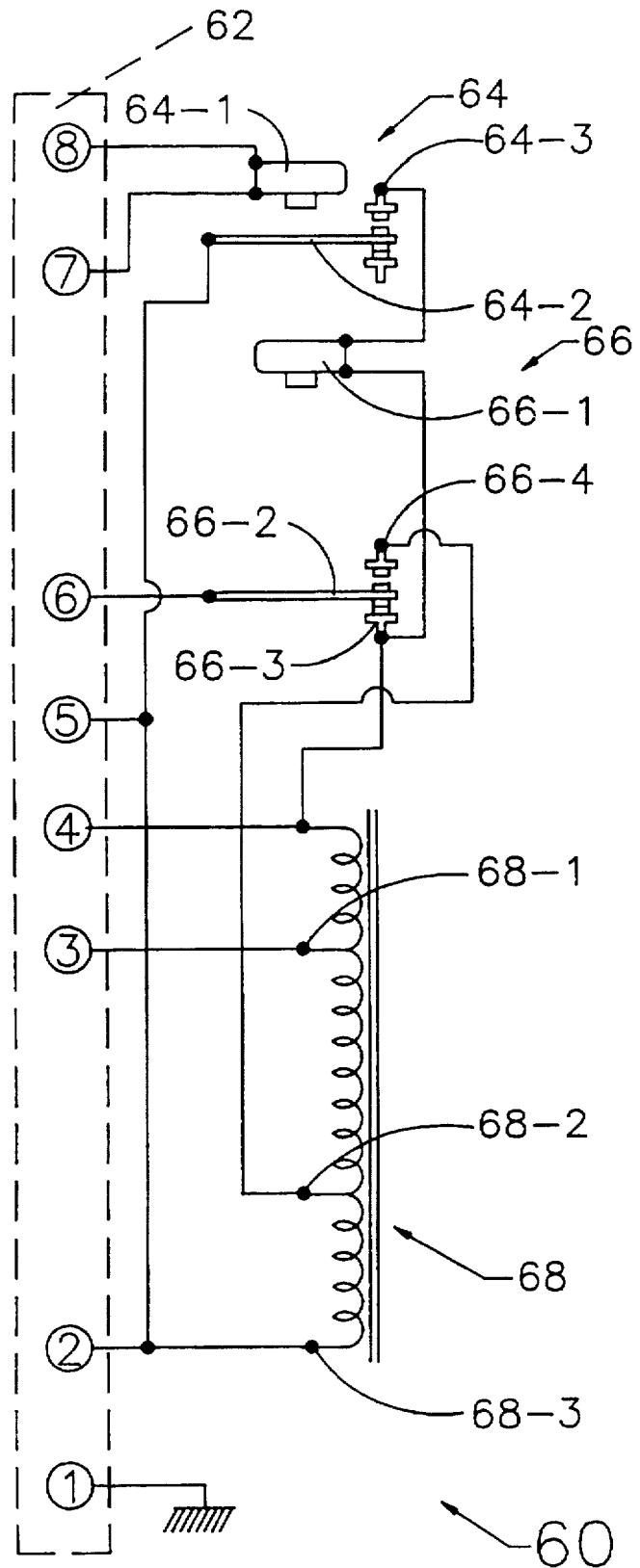
FIG. 4 is a schematic diagram of an energy conservation device of the second preferred embodiment of the present invention.
Figure 5:
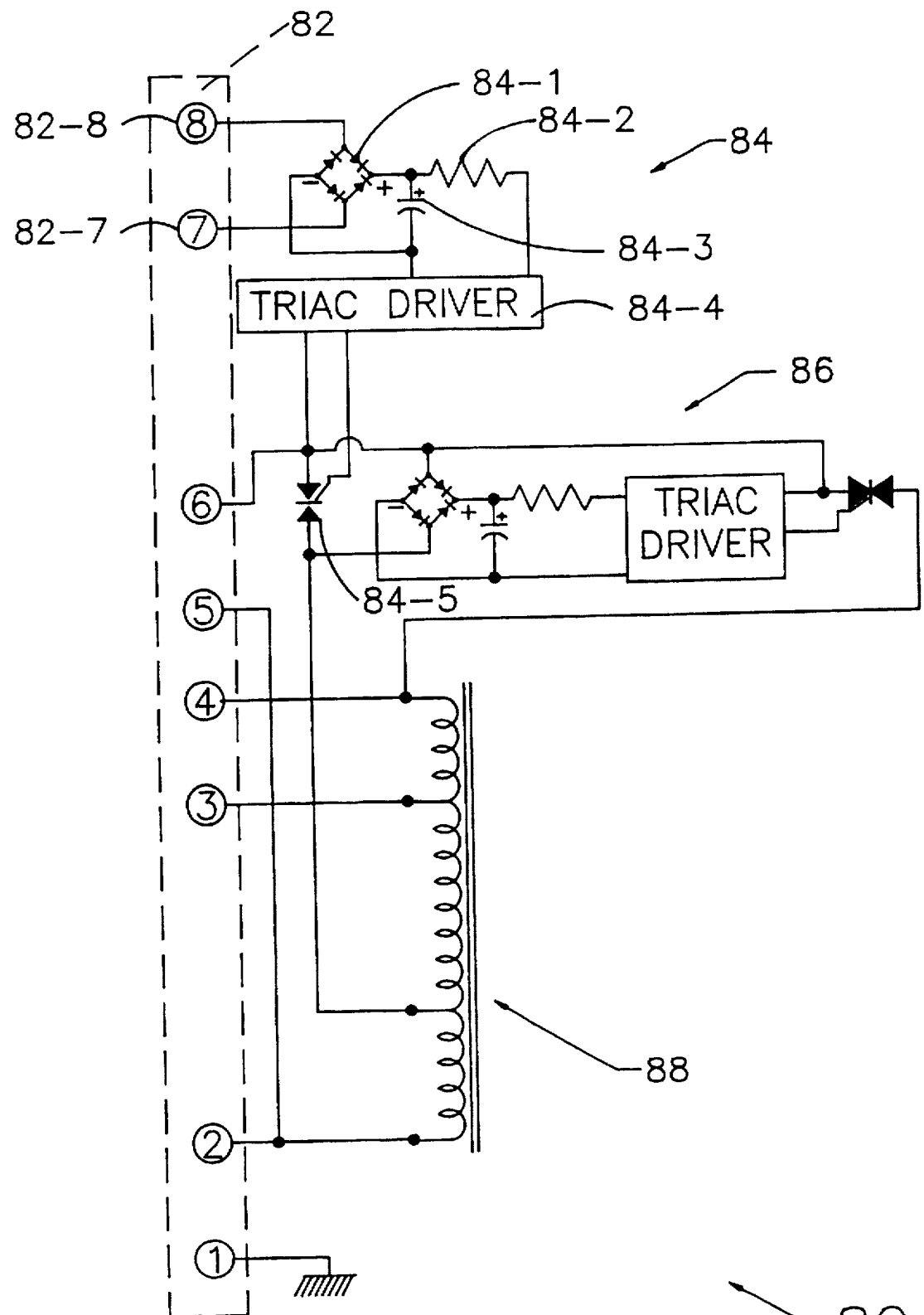
FIG. 5 is a schematic circuit diagram of an energy conservation device of the third preferred embodiment of the present invention.

It is further to be understood that, for example, energy conservation device 40 shown in FIG. 2 may be either the energy conservation device of the present invention shown in FIG. 4 or the energy conservation device of the present invention shown in FIG. 5, and may alternatively be the energy conservation device of the present invention shown in FIG. 3, provided that the impedance of the compressor motor or solenoid valve connected across lines 32, 34 externally to enclosure 12 is sufficiently low so that the connection of the relay coil of the energy conservation device of the invention shown in FIG. 3 between leads 32 and 34 does not effect the operation of the compressor or its associated refrigerant circulation system.

Referring now to FIG. 3, there is shown an energy conservation device 50 of the first preferred embodiment of the present invention.

It is to be understood that, in accordance with the present invention, all of the electrical components and interconnections shown in FIG. 3 are preferably encapsulated or potted in a suitable potting compound of well known type, in such manner that only the terminals of terminal board 52 are accessible to the installer.

Figure 6A:
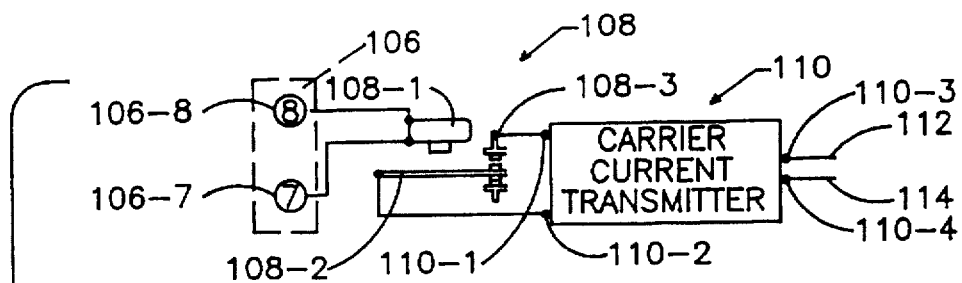
FIG. 6A is a schematic circuit diagram of the transmitter portion of the energy conservation device of the fourth preferred embodiment of the present invention.
Figure 6B:
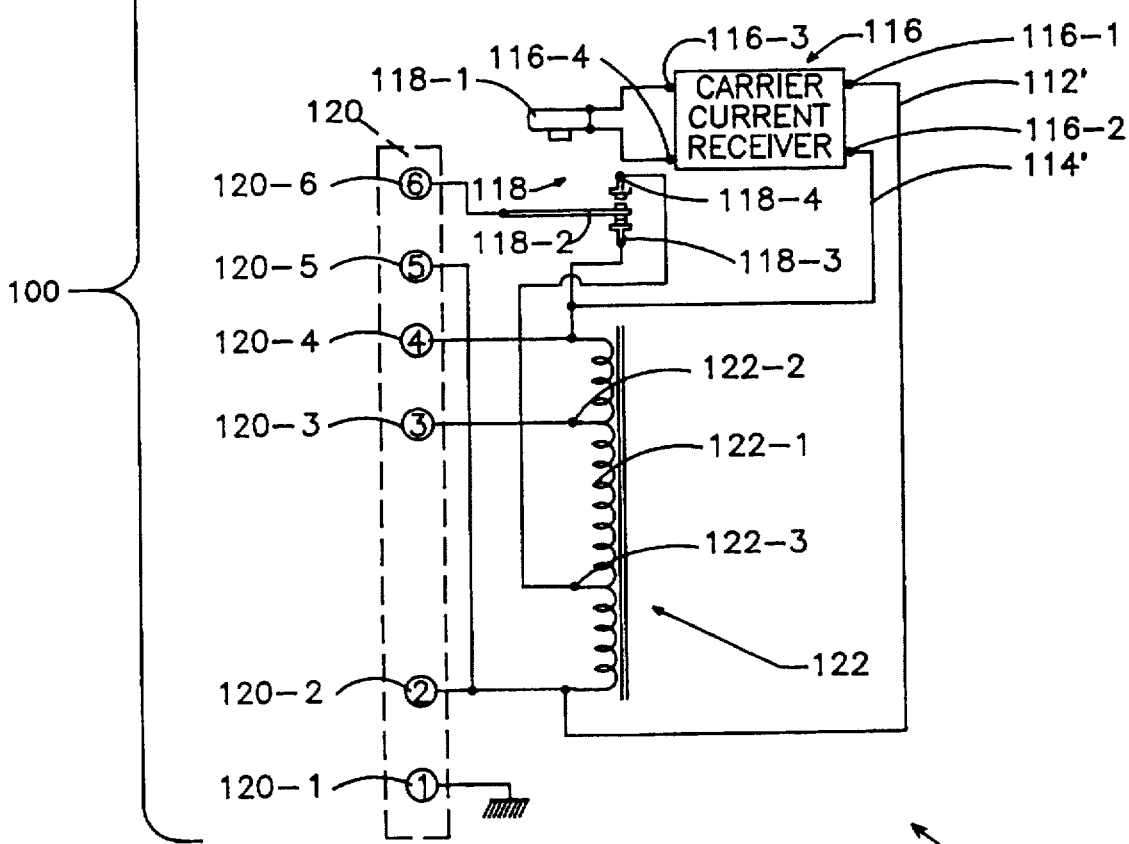
FIG. 6B is a schematic circuit diagram of the receiver portion of the energy conservation device of the fourth preferred embodiment of the present invention.

It is also to be understood that, in accordance with a principal feature of the present invention, the components and interconnections of the energy conservation devices of FIGS. 4 and 5 are similarly encapsulated, and that at least the relay and autotransformer, and their interconnections with the terminal board and the power line carrier current receiver of the energy conservation device of FIG. 6B are similarly encapsulated or potted.

Referring again to FIG. 3, it will be seen that the coil 54-1 of relay 54 is connected directly across terminals 52-7 and 52-8, and that movable contact 54-2 of power relay 54 is directly connected to terminal 52-6.

As further seen in FIG. 3, autotransformer 56 is comprised of a coil winding 56-1 to which are connected two taps 56-2, 56-3. Tap 56-3 is directly connected to the upper fixed (normally open) contact 54-3 of relay 54, and lower fixed (normally closed) contact 54-4 of relay 54 is directly connected to the upper end 56-4 of coil 56-1, and also directly connected to terminal 52-4.

As further seen in FIG. 3, the lower end 56-5 of coil 56-1 is directly connected to terminal 52-5 and also to terminal 52-2, and upper tap 56-2 of coil 56-1 is directly connected to terminal 52-3.

Terminal board 52 is also provided with a terminal 52-1 which serves as a ground contact. Terminal 52-1 may also be directly connected to a metallic case or can in which said encapsulating material or potting compound is contained.

Comparing FIGS. 2 and 3, it will be seen that when energy conservation device 50 of the present invention (FIG. 3) is installed in refrigerator chamber 10 (FIG. 2) as energy conservation device 40, the electrical components of energy conservation device 50 will be interconnected with the elements of the refrigeration system of refrigerated chamber 10 as follows.

Coil 54-1 of relay 54 will be connected across thermostat terminals lines 32, 34.

Movable contact 54-2 will be contacted to buss 28' interconnecting fan motors 24.

The lower end 56-5 of auto transformer coil 56-1 will be connected directly to the other buss 26' interconnecting fan motors 24 and also to fan motor energizing lead 26.

The upper end 56-4 of auto transformer coil 56-1 will be connected directly to fan motor energizing lead 28, or, alternatively, upper tap 56-2 of coil 56-1 will be directly connected to lead 28.

The lower end 56-5 of coil 56-1 will be directly connected to fan motor energizing voltage lead 26.

Grounding terminal 52-1 will be directly connected to the ground connection of evaporator 16.

In view of the above comparison of FIGS. 2 and 3, it will now be understood by those having ordinary skill in the art, informed by the present disclosure, that throughout the present specification the single Arabic numeral designations of the terminals of the energy conservation devices of the present invention have the following significances.

Terminal (1) is in each case an earth/chassis ground connection.

Terminal (2) is the common AC (alternating current) voltage input terminal.

Terminal (3) is the "hot" AC voltage input terminal to be used when the local line voltage at the site of the refrigerated chamber in which the device of the invention is to be installed is substantially lower than the nominal line voltage.

Terminal (4) is the "hot" AC voltage input terminal to be used when the local line voltage at the site of the refrigerated chamber in which the device of the invention is to be installed is the nominal line voltage, or close to it.

Terminals (5) and (6) are the output terminals of the energy conservation device of the invention which are to be attached to the evaporator fan motor terminals or evaporator fan motor terminal busses.

Terminals (7) and (8) are the thermostatic switch or pressure control switch connection terminals which are to be connected to the two terminals of the thermostatic switch or pressure control switch of the refrigeration system of the refrigerated chamber to which the device of the invention is to be retrofitted.

FIG. 3 shows a second version of said first preferred embodiment in which autotransformer 56 (FIG. 3) is replaced by a transformer 59 of which 59-1 is the primary winding and 59-2 is the secondary winding. The primed reference numerals designate parts corresponding to the parts of FIG. 3 which have the same reference numerals, unprimed.

Referring now to FIG. 4, there is schematically represented the circuit components and interconnections of the energy conservation device 60 of the second preferred embodiment of the present invention.

As seen in FIG. 4, energy conservation device 60 is generally comprised of a terminal board 62, a sensitive relay 64, a power relay 66, and an autotransformer 68, interconnected as indicated in FIG. 4. The interconnections graphically represented in FIG. 4 will be clear to those having ordinary skill in the art, observing the graphical conventions illustrated in FIG. 3 and the text of the present specification related thereto.

Comparing FIGS. 2 and 4, and assuming energy conservation device 60 to be installed as the energy conservation device 40 of FIG. 2, the mode of operation of energy conservation device 60 will be understood by those having ordinary skill in the art, informed by the present disclosure, to be generally as follows.

The coil 64-1 of sensitive relay 64 is connected across the terminals 32', 34' of thermostatic switch or pressure control switch 30.

Thus, when thermostatic switch or pressure control switch 30 is closed coil 64-1 is deenergized and movable contact 64-2 is urged against fixed contact 64-3.

As will also be evident to those having ordinary skill in the art, coil 66-1 of power relay 66 is deenergized when coil 64-1 of sensitive relay 64 is deenergized.

Thus, it will be seen from the above that when thermostatic switch 30 is closed, power relay coil 66-1 is deenergized, and consequently movable contact 66-2 of power relay 66 is urged against fixed contact 66-3.

Thus, the busses 26', 28' to which evaporator fan motors 24 are connected are themselves connected across the two ends 56-4, 56-5 of autotransformer coil 68-1 and the higher energizing voltage is applied to fan motors 24, and thus evaporator fans 22 operate at their maximum rotational speed.

When, on the other hand, the contacts of thermostatic switch 30 are open, the voltage applied across thermostatic switch leads 32, 34 is applied to coil 64-1 of sensitive relay 64, and thus coil 66-1 of power relay 66 is energized, and movable contact 66-2 is urged against fixed contact 66-4.

In this operating state of power relay 66 the busses 26', 28' to which evaporator fan motors 24 are connected are themselves connected between lower tap 68-2 and the lower end 68-3 of power autotransformer coil 68-1, and thus evaporator fans 22 are operated at greatly reduced speed, sufficient only to prevent stratification of the air in insulated chamber 14, and to produce sufficient heat to prevent "undershooting" of the temperature in insulated chamber 14 as hereinabove described.

Thus, it will be seen'by those having ordinary skill in the art, informed by the present disclosure, that energy conservation device 60 functions to operate evaporator fan motors 24 at maximum speed when thermostatic switch 30 is closed, and functions to operate evaporator fan motors 24 at greatly reduced speed when thermostatic switch 30 is open.

Referring now to FIG. 5, there is schematically represented the energy conservation device 80 of the third preferred embodiment of the present invention.

As will be evident to those having ordinary skill in the art, informed by the present disclosure, energy conservation device 80 is generally comprised of a terminal board 82, a first electronic relay 84, a second electronic relay 86, and an autotransformer 88, all interconnected as indicated in FIG. 5, observing the circuit representation conventions indicated hereinabove in connection with FIG. 3.

Electronic relay 84 is comprised of a bridge rectifier 84-1, a resistor 84-2, a capacitor 84-3, an integrated circuit 84-4 of the kind sometimes called a "triac driver" and a solid state device 84-5 of the kind sometimes called a "triac".

Electronic relay circuits of this type are well known to those having ordinary skill in the art, and do not constitute part of the present invention.

By way of example, capacitor 84-3 may be a 33 microfarad capacitor and resistor 84-2 may be a 6.2 kilohm resistor when the compressor energizing voltage appearing across terminals 82-7, 82-8 is 120 volts, or a 12 kilohm resistor when that voltage is 220 volts. Bridge 84-1 may be comprised of four 1N4004 diodes, or may be a 1 ampere bridge rectifier. Triac driver 84-4 may be a Motorola MOC 3031 triac driver, and triac 84-5 a Motorola MAC 3040-25 triac. The same circuit components may be used in the relay 84 and relay 86 sub-circuits.

As will now be evident to those having ordinary skill in the art, informed by the present disclosure, electronic relays 84, 86 function in a manner similar to electromechanical relays 64, 66 in the second preferred embodiment of the present invention shown in FIG. 4.

Thus, it will be evident to those having ordinary skill in the art, informed by the present disclosure, that energy conservation device 80 serves substantially the same function as energy conservation device 60, coordinating the operation of thermostatic switch 30 with the operation of fan motors 24 in the same manner as energy conservation device 60 when energy conservation device 80 is installed as energy conservation device 40 in refrigerated chamber 10 of FIG. 2.

Referring now to FIGS. 6A and 6B, there is shown the energy conservation device 100 of the fourth preferred embodiment of the present invention.

Energy conservation device 100 differs from the energy conservation devices of the first three preferred embodiments in that it is subdivided into two separate components, viz., transmitter unit 102 and receiver unit 104.

Energy conservation device 100 is particularly adapted to be installed in one of the larger refrigerated chamber installations wherein the thermostatic switch or pressure control switch is located remotely from the evaporator, such that the running of lines between the thermostat switch terminals of the energy conservation device and the thermostatic switch or switches would occasion great difficulty when retrofitting to an existing large refrigerated chamber.

Since such a large refrigerated chamber installation is schematically identical to the smaller installations, FIG. 2 is to be understood to also represent such large installations.

As seen in FIG. 6A, receiver 102 of the fourth preferred embodiment of the present invention is comprised of a terminal board 106 on which are provided two terminals 106-7 and 106-8.

Receiver 102 is further comprised of a sensitive relay 108, the coil 108-1 of which is connected between terminals 106-7 and 106-8.

Receiver 102 further comprises a carrier current transmitter 110 of well known type, having two input terminals 110-1, 110-2, and two output terminals 110-3, 110-4.

Carrier current transmitter 110 may be a commonly available Model X10 controller and appliance module originally made by BSR, or a similar unit known as the General Electric "Sentry", or the corresponding device sold by Radio Shack.

As further seen in FIG. 6A, movable contact 108-2 of relay 108 is connected to input terminal 110-2 of carrier current transmitter 110, and normally open contact 108-3 of relay 108 is directly connected to input terminal 110-1 of carrier current transmitter 110.

Output terminals 110-3 and 110-4 of carrier current transmitter 110 are connected, respectively, to two wires 112, 114 of the electrical power supply system of the building in which is located the refrigerated chamber to the refrigeration system of which energy conservation device 100 is retrofitted.

Further, carrier current transmitter 110 and carrier current receiver 116 (FIG. 6B) are tuned to the same carrier frequency and decoded address, and the input terminals of carrier current receiver 116 are connected to wires 112', 114' of the electrical power supply system of said building, in the well known manner, whereby signals applied to the electrical power supply system of said building by carrier current transmitter 110 are received by carrier current receiver 116.

As seen in FIG. 6B, receiver 104 is further comprised of a power relay 118, and the coil 118-1 of power relay 118 is connected to the output terminals 116-3, 116-4 of carrier current receiver 116.

As now will be evident to those having ordinary skill in the art, informed by the present disclosure, relay 108 is so connected to the input terminals of carrier current transmitter 110, carrier current transmitter 110 and carrier current receiver 116 are so interconnected via the electric power supply system of said building, and power relay 118 is so connected to the output terminals of carrier current receiver 118 that when the contacts of the thermostatic switch 30 of the refrigerated chamber 10 installed in that building (FIG. 2), connected between terminals 106-7 and 106-8 are closed, and thus no energizing voltage is applied to relay coil 108-1, relay coil 118-1 is not energized, and thus movable contact 118-2 of relay 118 is in contact with fixed contact 118-3 of relay 118.

Conversely, whenever coil 108-1 is energized, the contacts of thermostatic switch 30 (FIG. 2) being open, movable contact 118-2 of relay 118 is in contact with upper fixed contact 118-4 of relay 118.

Referring again to FIG. 6B, it will be seen that receiver 104 is further comprised of a terminal board 120, the terminals of which are numbered in the same manner and are intended to be functionally interconnected with the refrigeration system of the thus equipped refrigerated box in the same manner as the correspondingly numbered terminals of FIGS. 2, 3, 4, and 5.

As further seen in FIG. 6B, receiver 104 is also comprised of an autotransformer 122 which includes a coil 122-1 having an upper tap 122-2, and a lower tap 122-3.

Autotransformer 122 is interconnected with relay 118 and terminal board 120 in the manner indicated in FIG. 6B, as will be understood by those having ordinary skill in the art observing the graphical conventions employed in FIGS. 3 through 5.

Thus, it will be seen that the joint operation of transmitter 102 and receiver 104 of the fourth preferred embodiment of the present invention causes fans 22 (FIG. 2) to be operated at their higher speed when the contacts of thermostatic switch 30 are closed, and to be operated at their lower speed when the contacts of thermostatic switch 30 are open.

Figure 7:
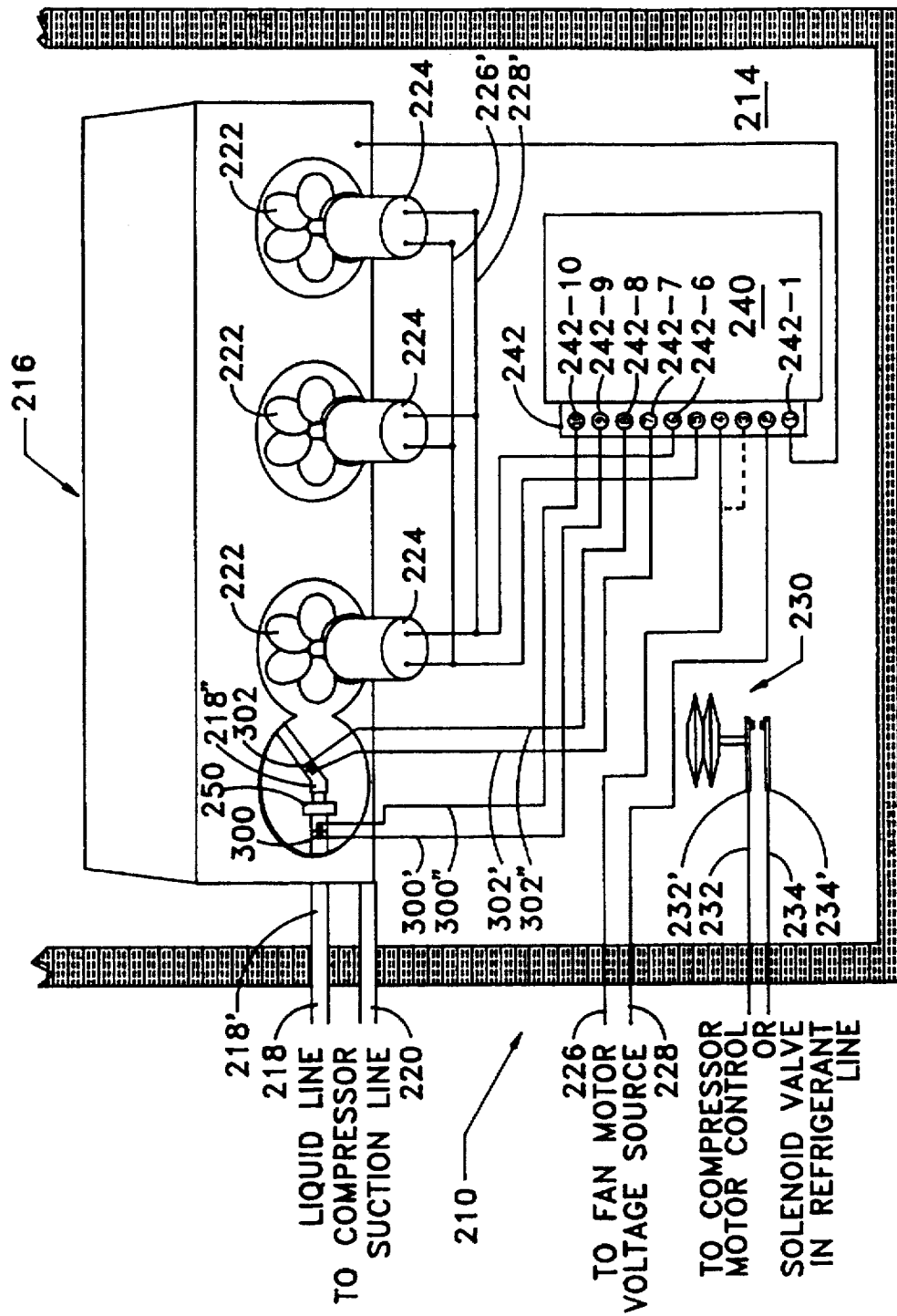
FIG. 7 is a schematic representation of a refrigerated chamber of the prior art equipped with an energy conservation device of the fifth preferred embodiment of the present invention.

Referring now to FIG. 7, there is schematically represented a refrigerated chamber 210 of the prior art and certain parts of its associated refrigeration system, provided with an energy conservation device of the fifth preferred embodiment of the present invention.

As seen in FIG. 7, refrigerated chamber 210 is comprised of an enclosure or housing 212 which defines an insulated chamber 214.

In the well known manner, the walls of refrigerated chamber 210 are generally fabricated from a material having thermal insulating properties, and include one or more doors which are normally closed, which doors may themselves have thermal insulating properties.

As further schematically represented in FIG. 7, typical prior art refrigerated chamber 210 further comprises an evaporator 216 of well known type which is located within insulated chamber 214.

Also in the well known manner, the heat transfer means of evaporator 216 is supplied with refrigerant under pressure by an associated compressor, located externally of enclosure 212, via a supply conduit 218, which refrigerant is returned to said external compressor via a return conduit 220 under lower pressure.

As further seen in FIG. 7, a plurality of evaporator fans 222 are suitably juxtaposed to evaporator 216 so as to pass an airstream over the heat transfer elements of evaporator 216, each fan 222 being driven by an associated electric motor 224.

Energizing voltage is supplied to evaporator fan motors 224 via common wires or busses 226', 228' which are themselves connected to output terminals of an energy conservation device 240 of the fifth preferred embodiment of the present invention, energy conservation 240 being itself supplied with electrical energy via connecting wires 226, 228 from a source of fan motor energizing voltage located outside enclosure 212.

In prior art refrigerated chambers this fan motor energizing voltage is most commonly a continuous, unswitched source of 120 volt, 208 volt, or 220 volt AC voltage.

As further seen in FIG. 7, a thermostatic switch 230 is also contained within insulated chamber 214, in the well known manner. Also in the well known manner, the terminals 232', 234' of thermostatic switch 230 are connected via insulated wires 232, 234 to the motor controller coil of the external compressor motor, or to a solenoid valve in refrigerant supply line 218.

It is to be particularly noted, however, that in accordance with a principal feature of the fifth preferred embodiment of the present invention thermostatic switch 230 is not connected to energy conservation device 240, directly or indirectly.

As will be evident to those having ordinary skill in the art, informed by the present disclosure, and particularly when comparing FIG. 1 and FIG. 7, the parts of refrigerated chamber 210 and its associated refrigerated system described hereinabove are conventional elements of such refrigerated chambers and their associated refrigeration systems, which are generally described hereinabove in connection with FIG. 1.

Referring again to FIG. 7, certain aspects of the fifth preferred embodiment of the present invention which are unique thereto will now be described.

As seen in FIG. 7, energy conservation device 240 is provided with a terminal board 242 which differs from the terminal boards of the devices of the earlier described preferred embodiments in that it is provided with ten terminals, rather than eight terminals as in the devices of the earlier described preferred embodiments.

In general, terminals 242-1 through 242-6, sometimes called terminals (1) through (6), inclusive, serve the same functions as the correspondingly numbered terminals (1) through (6) of the energy conservation devices of the earlier described embodiments of the present invention.

However, terminals 24-7 through 24-10, inclusive, i.e., terminals (7) through (10), do not correspond to any of the terminals on the terminal boards of the earlier preferred embodiments, but rather are parts of unique subcircuits, serving unique functions, in the fifth preferred embodiment.

Referring again to FIG. 7, it will be seen that, in the well known manner, an expansion valve 250 is inserted in liquid line 218, and is located within the housing of evaporator 216. The portion of liquid line 218 immediately downstream of evaporator 250 will sometimes hereinafter be designated by the reference numeral 218'. The portion of liquid line 218 immediately upstream of evaporator valve 250 will sometimes herein be designated by the reference numeral 218".

As further seen in FIG. 7, in accordance with the principles of the fifth preferred embodiment of the present invention a thermoelectric temperature sensor and transducer 300, sometimes herein called a "temperature sensor", is affixed to downstream portion 218' of liquid line 218 adjacent expansion valve 250 and in direct heat transfer relationship thereto, as by clamping.

Similarly, in accordance with the principles of the fifth preferred embodiment of the present invention a second thermoelectric temperature detector and transducer 302, sometimes also called a "temperature sensor", is affixed to the upstream portion 218" of liquid line 218 immediately above expansion valve 250 and in direct heat transfer relationship thereto, as by clamping.

As further seen in FIG. 7, the electrical output signal of temperature sensor 300 is directly connected to terminals 242-9, 242-10 of energy conservation device 240 by means of low voltage wires 300', 300".

Similarly, the electrical output signal of temperature sensor 302 is directly connected, via low voltage wires 302', 302", to terminals 242-7, 242-8 of energy conservation device 240.

It is to be noted as a particular feature of the fifth preferred embodiment of the present invention that since energy conservation device 240 can be mounted directly on the cabinet of evaporator 216, low voltage wires 300', 300", 302', 302" can be very short, and can be easily installed.

It is also to be noted that because wires 300', 300", 302', 302" are low voltage wires, no special insulating means, cable armor, circuit breakers, or the like, need be provided, thus minimizing the cost of installing energy conservation device 240 of the fifth preferred embodiment in most conventional refrigerated chambers.

Figure 8:
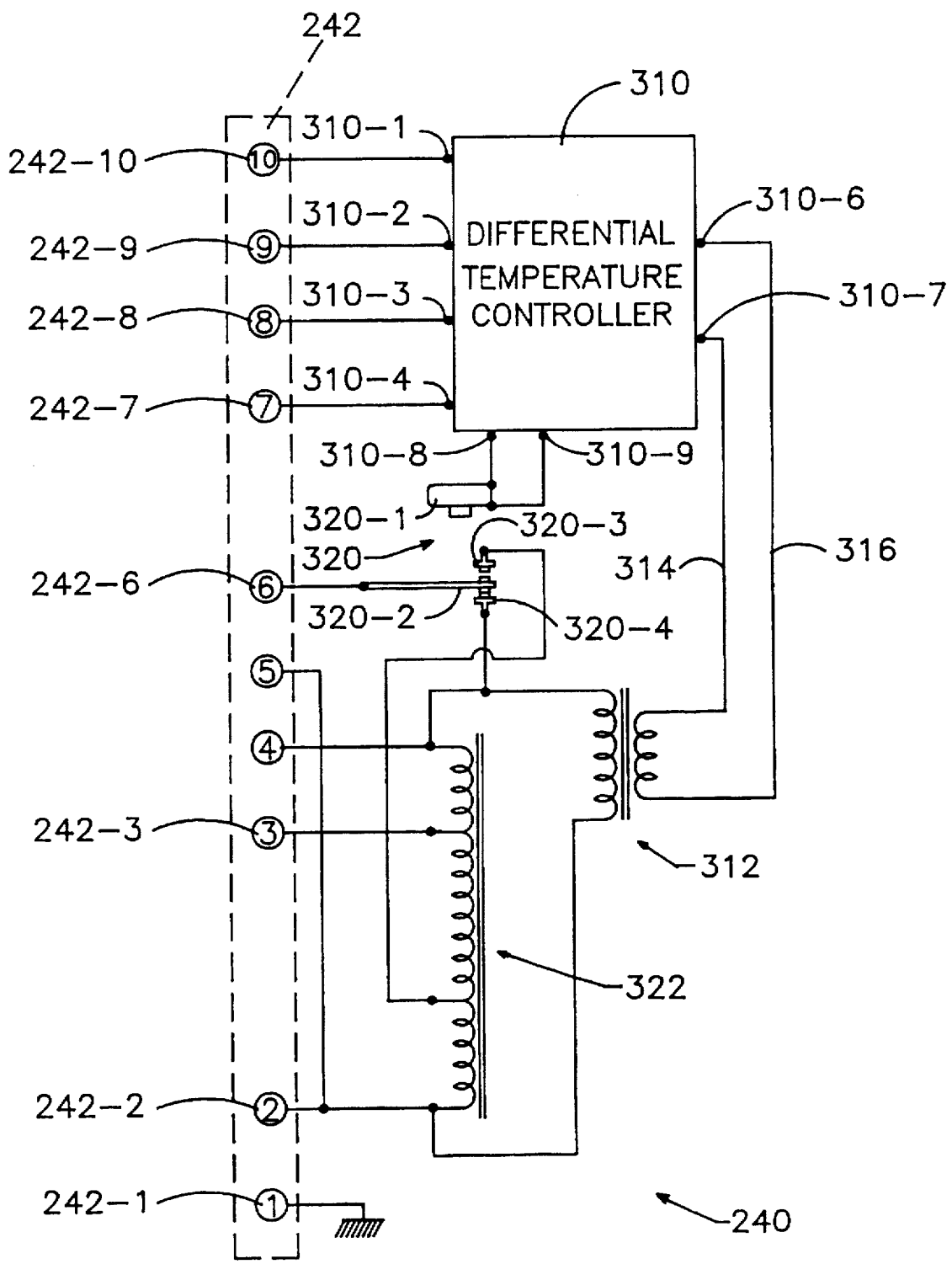
FIG. 8 is a schematic circuit diagram of an energy conservation device of the fifth preferred embodiment of the present invention.

Referring now to FIG. 8, the circuit of energy conservation device 240 is schematically represented.

It is to be understood that energy conservation device 240, like the energy conservation devices of the other preferred embodiments earlier described herein, is preferably encapsulated to protect the circuit components and internal interconnections from the moisture which forms within insulated chamber 14, from thermal shock, from mechanical damage, and from tampering.

As seen in FIG. 8, a principal component of energy conservation device 240 is a differential temperature controller 310. The circuit components and interconnections of differential temperature controller 310 will be described in detail hereinafter in connection with FIG. 9.

As also seen in FIG. 8, differential temperature controller 310 is provided with two pairs of signal input terminals 310-1, 310-2 and 310-3, 310-4, a pair of power input terminals 310-6, 310-7, and a pair of output terminals 310-8, 310-9.

Energizing voltage for energizing differential temperature controller 310 is provided by means of a low voltage transformer 312 the secondary winding of which is connected to power input terminals 310-6, 310-7 via connecting wires 314, 316.

Figure 9:
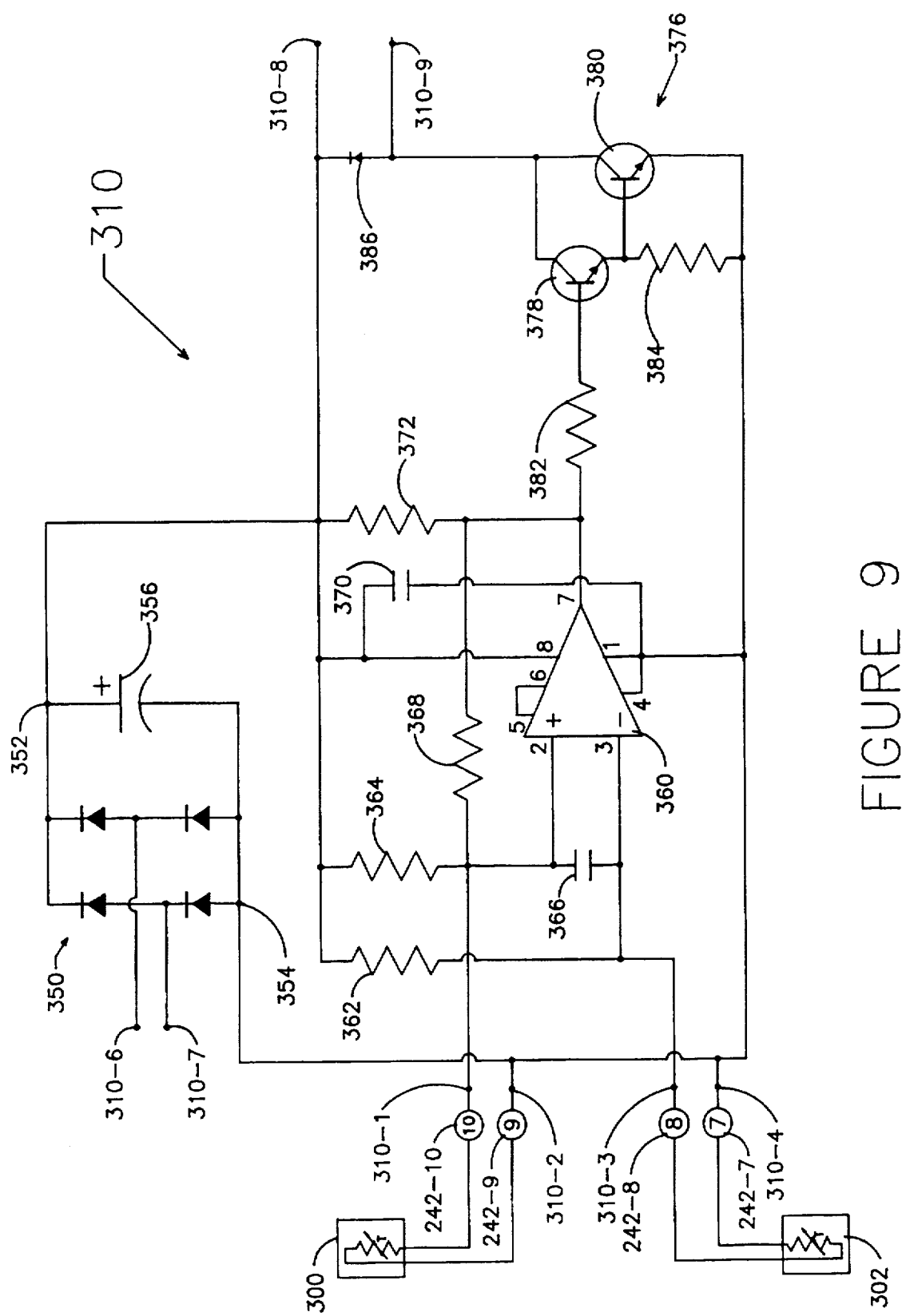
FIG. 9 is a schematic circuit diagram of the differential temperature controller portion of the energy conservation device of the fifth preferred embodiment of the present invention shown in FIG. 8.

In the version of the fifth preferred embodiment shown in FIGS. 8 and 9 the energizing voltage between terminals 310-6, 310-7 is approximately 12 volts AC.

As also seen in FIG. 8, the coil 320-1 of a power relay 320 is connected between output terminals 310-8, 310-9 of differential temperature controller 310.

As will be evident to those having ordinary skill in the art, informed by the present disclosure, power relay 320 serves substantially the same function as power relay 54 of FIG. 3.

As also seen in FIG. 8, energy conservation device 240 further comprises an autotransformer 322.

Power relay 320 and autotransformer 322 are interconnected in the same manner in which power relay 54 and autotransformer 56 are interconnected in FIG. 3.

Further, the contacts 320-2, 320-3, 320-4 of power relay 320 are interconnected, respectively, with terminal 242-6 and with autotransformer 322 in the same manner in which the contacts of power relay 54 are interconnected with terminal 52-6 and autotransformer 56 in FIG. 3.

Thus, the interrelationship and operation of the contacts of power relay 320 and autotransformer 322, and their respective connections with terminals 242-1 through 242-6, will be understood by those having ordinary skill in the art by reference to FIG. 3 and the text of the present specification related thereto.

Referring now to FIG. 9, there is schematically represented the internal circuit components and interconnections of differential temperature controller 310.

In general, differential temperature controller 310 serves to energize coil 320-1 of power relay 320 (FIG. 8), and thus to operate evaporator fans 222 at low speed, only when the difference between the temperatures of liquid line portions 218' and 218" (FIG. 7) is no greater than 4 or 5 degrees Farenheit.

When this temperature difference exceeds 8 degrees Farenheit, the evaporator fans are energized to operate at high speed.

It is to be particularly noted that in accordance with a particular feature of the present invention the particular differential temperature control circuit shown in FIG. 9 operates hysteritically, so that the state of power relay 320 changes at a higher temperature when said temperature difference is increasing than the temperature at which its state changes when said temperature difference is decreasing.

Referring again to FIG. 9, it will be seen that the circuit of differential temperature controller 310 includes a bridge rectifier 350 for converting the AC energizing voltage provided at terminals 310-6, 310-7 to direct current (DC) voltage between circuit junctions 352, 354.

Bridge circuit 354 may be comprised of four 1N4001 solid state rectifiers, or may be a suitable integrated circuit rectifier.

Capacitor 356 is a 1,000 microfarad, 35 volt, electrolytic capacitor, which serves to filter out substantially all of the 60 Hertz ripple which otherwise would appear across circuit junction points 352, 354.

As further shown in FIG. 9, temperature sensors 300, 302 (FIG. 7) are negative temperature coefficient thermistors, having a nominal resistance of 10,000 ohms.

The circuit of differential temperature controller 310 as shown in FIG. 9 further comprises a voltage comparator integrated circuit of well known type, preferably an LM211 integrated circuit.

While the terminals of voltage comparator integrated circuit 360 as shown in FIG. 9 are identified by their usual commercial designations, it is to be understood that these same terminals will be referred to in the present text as suffixes following "360-". Thus, commonly designated input terminal 2 of voltage comparator integrated circuit 360 will sometimes herein be referred to as terminal 360-2, and commonly designated output terminal 7 of voltage comparator integrated circuit 360 will sometimes herein be referred to as terminal 360-7.

Resistor 362 is a 51 kilohm resistor, and resistor 364 is a 47 kilohm resistor.

It will be understood by those having ordinary skill in the art, informed by the present disclosure, that temperature sensor thermistors 300, 302 and resistors 362, 364 are jointly configured as a bridge circuit the output terminals of which are connected, respectively, to terminals 360-2 and 360-3 of voltage comparator integrated circuit 360.

Capacitor 366 is a 220 picofarad capacitor which serves to filter out electrical noise which otherwise would be applied between terminals 360-2, 360-3 of voltage comparator integrated circuit 360, causing erratic operation.

Resistor 368 is a 1 megohm resistor which serves, in the manner well known in voltage comparator integrated circuit interconnections, to provide operational hysteresis as described hereinabove.

Capacitor 370 is a 0.1 microfarad capacitor which serves, in the well known manner, as a DC filter to block electrical noise which otherwise might adversely affect the operation of voltage comparator integrated circuit 360.

Resistor 372 is a 2.2 kilohm resistor which functions, in the well known manner, as the pull up resistor for voltage comparator integrated circuit 360.

Subcircuit 376, comprised of transistors 378, 380 connected in the well known Darlington configuration, serves to provide driving current for the coil 320-1 of power relay 320 (FIG. 8).

Resistor 382 is a 270 ohm current limiting resistor which functions, in the well known manner, to limit the current flow entering the base of transistor 378.

Resistor 384 is a 10 kilohm resistor which functions, in the well known manner, to insure the turnoff of transistors 378, 380.

Diode 386, which may be a 1N4001 diode, serves in the well known manner to block the inductive spike inherently produced by relay coil 320-1 from entering and destroying transistor 380.

As may be seen by comparison of FIGS. 8 and 9, the coil 320-1 of power relay 320 (FIG. 8) is connected across diode 386.

Thus, it will be seen by those having ordinary skill in the art, informed by the present disclosure, that differential temperature controller 310 receives electrical temperature signals from temperature sensors 300, 302 (FIG. 7) and operates power relay 320 in accordance with the temperature difference across the expansion valve 250 (FIG. 7).

It will thus be seen that the objects set forth above, among those made apparent from the preceding description, are efficiently attained, and since certain changes may be made in the above constructions and the methods carried out thereby without departing from the scope of the present invention, it is intended that all matter contained in the above description or shown in the accompanying drawings shall be interpreted as illustrative only, and not in a limiting sense.

It is also to be understood that the following claims are intended to cover all of the generic and specific features of the invention hereindescribed, and all statements of the scope of the present invention which, as a matter of language, might be said to fall therebetween.

What is claimed is:

1. A device for conserving energy in a refrigeration chamber utilizing a compressor external to the chamber and an evaporator having an expansion valve, a plurality of evaporator fans and a thermostatic switch located within said chamber, comprising:
   a. a fan power supply, including a source of single phase alternating; power and transforming means comprising an auto transformer for selectively providing a first energizing voltage to run the plurality of evaporator fans at a high speed, and a second energizing voltage to run the plurality of evaporator fans at a low speed; and
   b. control means for regulating the operation of said fan power supply in accordance with the thermostatic switch, said control means further including switching means responsive to said thermostatic switch to selectively energize said first and second voltages, said switching means including a first electronic power relay having a triac driver connected to a triac, a second electronic relay having a triac driver connected to a triac, said first and second electronic relays operatively connected to said auto transformer to provide said first and second energizing voltages to run said plurality of evaporator fans.

2. The device of claim 1 in which said first and second electronic relays further include means for encapsulating said first and second electronic relays for resistance to conditions within said refrigerators chamber.

* * * * *